Oct. 3, 1967 E. GORDON 3,344,705
PENUMBRA-AVOIDING SHUTTER DEVICES FOR VIEWERS AND PROJECTORS
Filed March 8, 1965 2 Sheets-Sheet 1

INVENTOR,
Elias Gordon
BY
ATTORNEY.

Oct. 3, 1967

E. GORDON 3,344,705

PENUMBRA-AVOIDING SHUTTER DEVICES FOR VIEWERS AND PROJECTORS

Filed March 8, 1965

INVENTOR,
Elias Gordon,
BY

ATTORNEY.

United States Patent Office 3,344,705
Patented Oct. 3, 1967

3,344,705
PENUMBRA-AVOIDING SHUTTER DEVICES
FOR VIEWERS AND PROJECTORS
Elias Gordon, 131 E. 93rd St.,
New York, N.Y. 10028
Filed Mar. 8, 1965, Ser. No. 437,943
15 Claims. (Cl. 88—24)

This application is a continuation-in-part of my application filed on Jan. 14, 1964 under Ser. No. 337,674, now U.S. Patent No. 3,283,649, issued Nov. 8, 1966.

The present invention relates to adjustable shutter devices for viewers and projectors used for instance for the study of X-ray films and is particularly adaptable for shutters of the type which are behind and compelled to be a bit spaced from a transparent pane, against the front surface of which, the film is held.

The objectionable feature experienced with this type of shutter is that a penumbra will occur. This of course means that the perimetral lane around the shutter opening of the film being viewed or projected, will be blurred.

It is therefore the principal object of this invention to provide novel and improved shutter constructions of the type afore-mentioned in which the components thereof are so associated that the occurrence of a penumbra is eliminated.

A further object thereof is to provide improved and novel shutter constructions of the character described, which are simple in structure, reasonable in cost and efficient in carrying out the purposes for which they are designed.

Other objects and advantages will become apparent as this disclosure proceeds.

The present invention presents improvements applicable in the adjustable shutter shown in my said pending application. Said shutter consists essentially of four pliable shades wound on individual rollers which are mounted in a rectangular formation in back of and adjacent to a transparent pane; the leading edges of opposite rollers being movable towards and away from each other to alter the dimensions of the central rectangular opening determined by them. The lead edge of each shade carries a stiff strip. When such strips are moved towards each other, the shades unwind from their rollers and when moved apart, the shades will wind up on their rollers. Corresponding ends of opposite rollers are connected by belts, the flights of each of which are crossed; the lead edge strips being secured to appropriate belt flights so that upon rotation of opposite rollers, their associated shades will move in opposite directions along the pane. Being that the said belts are in planes perpendicular to said pane, said lead edge strips will be at varying distances from the pane, depending upon the extent of the shutter opening; such distance increasing as opposite shades approach each other and decreasing as opposite shades move apart.

For the practice of this invention, I provide that the perimeter of the shutter opening shall be determined by members which contact the pane and press against it. Such members, carried by said lead edge strips, may be flat blades, sweep strips, rollers or combinations thereof, all of which may be against only one pane surface, or they may be arranged so that some of them are against the back surface and the remainder are against the front surface of said pane, in which instance it is preferred that one related pair of such members shall bear on one face of the pane and the other related pair, on the other face thereof.

Figure 2:
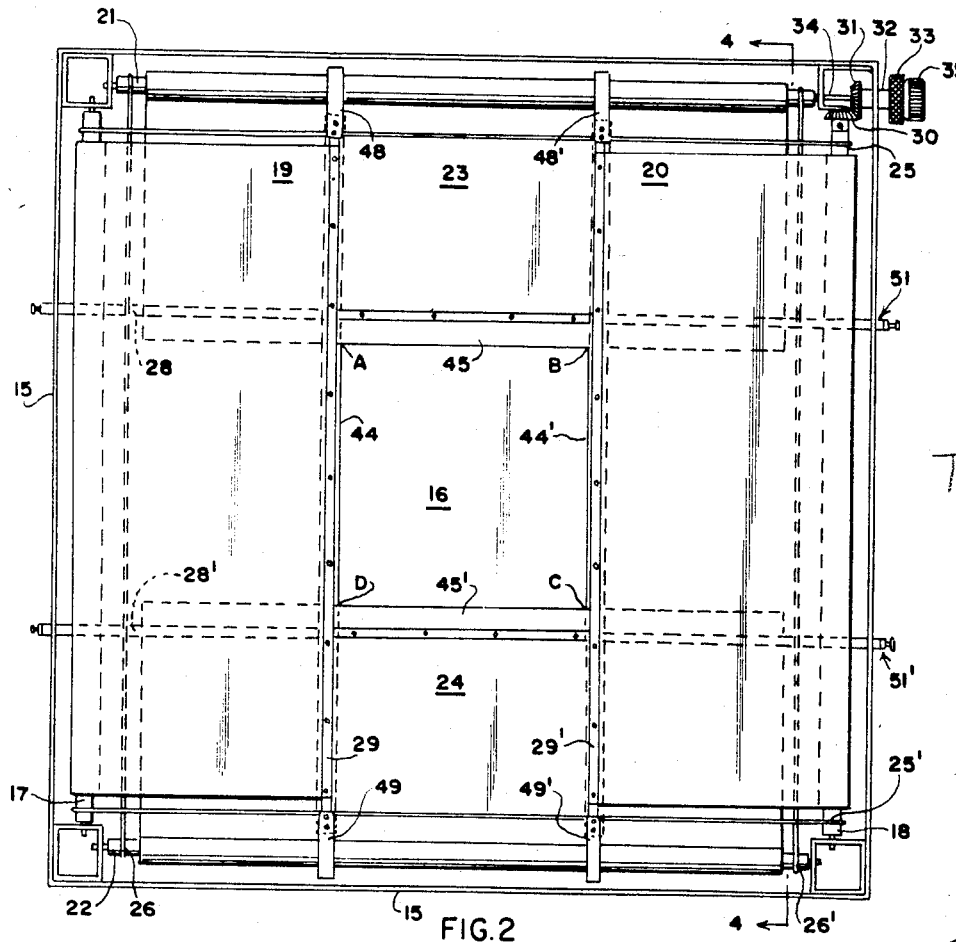
FIG. 2 is an enlarged rear view of said shutter device. The crossed belts connecting opposite shade rollers are here shown diagrammatically.
Figure 1:
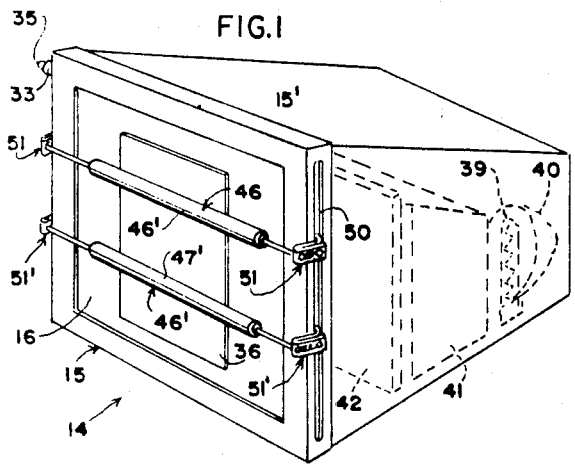
FIG. 1 is a perspective view of a film-viewing apparatus equipped with shutter mechanism embodying teachings of this invention and particularly where rollers serve to define opposite sides of the rectangular shutter opening or merely to hold the film, or such rollers serve both such functions.
Figure 3:
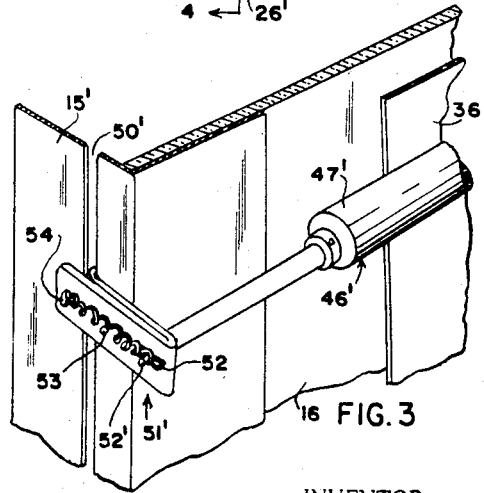
FIG. 3 is a fragmentary perspective view showing the manner in which a pressing roller is mounted.

The drawing shows that on the back of a rectangular frame 15 holding the transparent pane 16, there is along each edge thereof a rotatably mounted roller having a shade associated therewith to wind up and unwind therefrom, depending in which direction the roller is turned. Hence, there is one set of opposite rollers 17, 18 with their shades 19 and 20 and another set of opposite rollers 21, 22 with their shades 23 and 24; said respective sets being in perpendicular relation. The rollers 17 and 18 are connected by the endless belts 25, 25' and the rollers 21, 22 are connected by the endless belts 26, 26'; the flights in each of said belts being crossed so that upon rotation of one roller of any set, its companion roller will rotate in the opposite direction. Hence the shades 19, 20 will simultaneously wind up or unwind identically upon the rotation of one of their rollers and the shades 23 and 24 will simultaneously wind up or unwind identically upon the rotation of one of their rollers. The lead edge of each shade has a stiff elongated member therealong which extends beyond the side edges of the shade to the belts on the shade's roller whereto such extensions are secured; such attachments of each lead edge stiffener being to corresponding points on corresponding flights of the belts on the associated roller. So the stiff member 29 on the lead edge of the shade 19, has its ends attached at corresponding points on the belts 25, 25'. The stiff member 29' on the lead edge of the shade 20, has its ends attached to corresponding points on the belts 25, 25' which are on the flights other than to which the member 29 is attached. The stiff members 28 and 28', along the respective lead edges of the shades 23 and 24, are associated with the belts 26, 26' in like manner as the members 29, 29' are associated with the belts 25, 25'. In order that the center of the rectangle enclosed by the lead members shall always be the center of the pane 16, the points of attachment of the companion members 29, 29' on the belts 25, 25' are equidistant from the points of crossing of the flights of said belts. The same is true with respect to the companion members 28, 28' and their points of attachment to the belts 26, 26'. It is evident that the rectangle A, B, C, D, is the shutter opening for light directed from behind the shades of a viewer or projector fitted with the assembly shown in the drawings, to be its shutter mechanism. Making the frame with a rearward perimetral flange 15', permits mounting thereof on present view boxes for which the frame 15 will be manufactured to be of proper size to be so fitted. The adaptation of this shutter apparatus in viewers and projectors and the like can be readily done by those versed in the art, without further explanation or illustration.

In the embodiment shown in FIG. 2, provision is made to independently turn the rollers 18 and 21 from one region of control, for changing the shutter opening. A preferred way, is to have a bevel gear 30 which is secured on the roller 18, to be in engagement with the companion bevel gear 31 which is secured on a tubular shaft 32; the latter being journalled through the frame 15 and carries secured thereon the control knob 33 on the outside. The shaft 34 of the roller 21 extends through the tubular shaft 32 and outward of the knob 33, where it securely carries the control knob 35. It is apparent that to change the shutter opening A, B, C, D, adjustment is made by manipulating the control knobs 33 and 35 as is required.

It is to be noted that in the shutter construction to the extent set forth, the leading edges of the shades are always spaced from the pane 16 and that the distance of such spacing varies as previously explained. Such spaced relation from said pane in which the members 28, 28′, 29, 29′ are constantly, causes a penumbra to occur in the inner perimetral zone of the shutter opening A, B, C, D, and so in observing a film 36 set against the front of said pane as for instance in the viewer 37, the perimetral portion of the film part over the shutter opening, will be blurred.

I avoid the occurrence of a penumbra by having members contact the pane 16 so they determine the rectangle A, B, C, D. Such members are carried by the lead strips 28, 28′ and 29, 29′ on which they are resiliently mounted or they are resilient in nature so that they press against the pane at all times. These shutter opening determining members may be flat blades or slats 44, 44′, sweep strips 45, 45′ or rollers 46, 46′, which are given as examples thereof.

In the embodiment illustrated, the numerals 48 and 48′ denote inverted U-blade springs which straddle the roller 21. These springs being of sufficient size to admit the shade 23 fully rolled up. One arm of the spring 48 is secured to one end of the lead strip 29 and its other arm is secured to an end of a slat or blade 44 which bears flat against the back surface of the pane 16. The numerals 49, 49′ denote upright U-blade springs which straddle the roller 22 and are of sufficient size to admit the shade 24 fully rolled up. One arm of the spring 49 is secured to the other end of the lead strip 29 while its other arm is secured to the other end of said slat 44. In like manner, the blade 44′ which bears against the back surface of the pane 16, is associated with the lead strip 29′ by the springs 48′, 49′. All of said U-springs of course, biased to open so both slats or blades 44, 44′ are constantly pressed against the pane 16. Both of said blades and their associated lead strips are parallel.

The lead strip 28 carries a sweep strip 45 therealong which is of flexible rubber, plastic or the like and extends in wiping contact with the back surface of the pane 16 and the backs of said slats 44, 44′ which it crosses. The longitudinal edges of the slats, or at least those edges which are nearest each other in the assembly, are beveled as at 47″ to attain good contact at the vertices of the shutter opening, between the wiping edge of said sweep strip 45 and the pane. The lead strip 28′ carries the sweep strip 45′ in a similar manner. Said sweep strips and their associated lead strips are parallel. It is apparent that each of said slats 44, 44′ and sweep strips 45, 45′ will determine one line of the rectangle A, B, C, D; such lines being in contact with the pane 16. It is to be noted that regardless of the spacing of the lead strips 28, 28′, 29, 29′ from the pane 16, the shutter opening will be determined only by said slats and sweep strips.

The illustrated embodiment also shows the rollers 46 and 46′ across the front of the pane 16; such rollers being carried on the strip members 28, 28′ and parallel thereto. Such strip members extend through track slots 50, 50′ in the sides of the frame 15 and are bent forwardly outside the frame to make the bearings 51, 51′ for the end pintles as 52′ of said rollers 46, 46′. These pintles ride in slots as 52, extend therethrough and serve as an anchor for one end of a tensed tension coil spring as 53 whose other end is anchored to a pin as 54 extending from such bearing structure. This makes the mounting of each of the rollers 46, 46′ resilient and biased to press against the pane 16. It is preferred that the actual roller portion which contacts the pane shall be a sleeve; said sleeves being denoted by the numerals 47, 47′ and it is these that make a line contact with said pane and are used to hold for instance the X-ray film 36 against the pane. Though such line contact made by each of said rollers 46, 46′ are with the film, for present consideration, the film may be deemed part of the pane. Resiliency may be offered to facilitate the insertion of the film, by having said rollers 46, 46′ of suitable rubber material.

In the embodiment shown, said rollers 46, 46′ are employed to hold the film being viewed, but such rollers can be used to determine the lines AB and CD of the shutter opening, in which instance the sweep strips 45, 45′ are omitted.

It is believed that those versed in the mechanical arts will readily understand without further illustration that the resilient mountings 51, 51′ for the rollers 46, 46′ can be easily adapted to mount slats like 44, 44′ and have such slats bear resiliently against the front surface of the pane 16 or to mount bars having resilient sweep strips like 45, 45′ extending therefrom to press against the front surface of the pane 16 to serve in place of those bearing against the back surface of said pane. Of importance to note is that the means for determining any side of the rectangle A, B, C, D, may be a slat, a sweep strip or a roller bearing against the front or the back of the pane and that when the shutter opening determining members are of such character, the occurrence of a penumbra is avoided. In instances where rollers as 46, 46′ are used merely to hold the film 36 being viewed or projected, the members asociated therewith which determine perimeter lines of the shutter opening, shall be in advance of such rollers respectively as are the sweep strips 45, 45′ in their relation to said rollers as in the embodiment herein shown.

Assuming the apparatus of FIG. 2 serving as the shutter means of a viewer or projector, the film or other transparency 36 to be studied, is inserted between the rotatable sleeves 47, 47′ and the pane 16, so that said sleeves will press the film against said pane. Now determine what part of the film is to be viewed and shift the film so that such part thereof is about central of the pane. Now turn the knobs 33 and 35 in proper directions to bring the slats 44, 44′ and the sweep strips 45, 45′ to encompass the chosen area of the film to be viewed or nearly so and shift the film to bring the chosen area within the shutter opening thus effected, making any further adjustments with the knobs 33 and 35 as may be required, and of course, the film may be shifted in any direction in its plane. Though the film is free of manual hold, its position on the pane will not change while the distance between the rollers 46, 46′ is changed by manipulation of the control knobs 33, 35. When the shutter opening A, B, C, D, and the position of the film 36 have been adjusted as desired, the light source of the viewer or projector is then operated and the switch therefor may be located near said control knobs in total machines to be manufactured, so that the operator shall have all the controls in one region.

When the rollers 46, 46′ are moving away from each other, the possible drag on the film in one direction will be neutralized by an equal drag in the opposite direction and so the film will not move and will remain flat. The same is true when said rollers 46, 46′ move towards each other. The strengths of the springs as 53 are chosen to make it easy to insert the film against the pane and behind said sleeves 47, 47′ which turn freely so that the film will remain free of wrinkles and being across the film along spaced lines, the film will not curl.

The shades 19, 20, 23, 24 which shield the pane 16, are of opaque material and pliable; their inner ends being suitably secured to their respective rollers 17, 18, 21, 22 so that they can be wound up thereon.

Figures 4, 5:
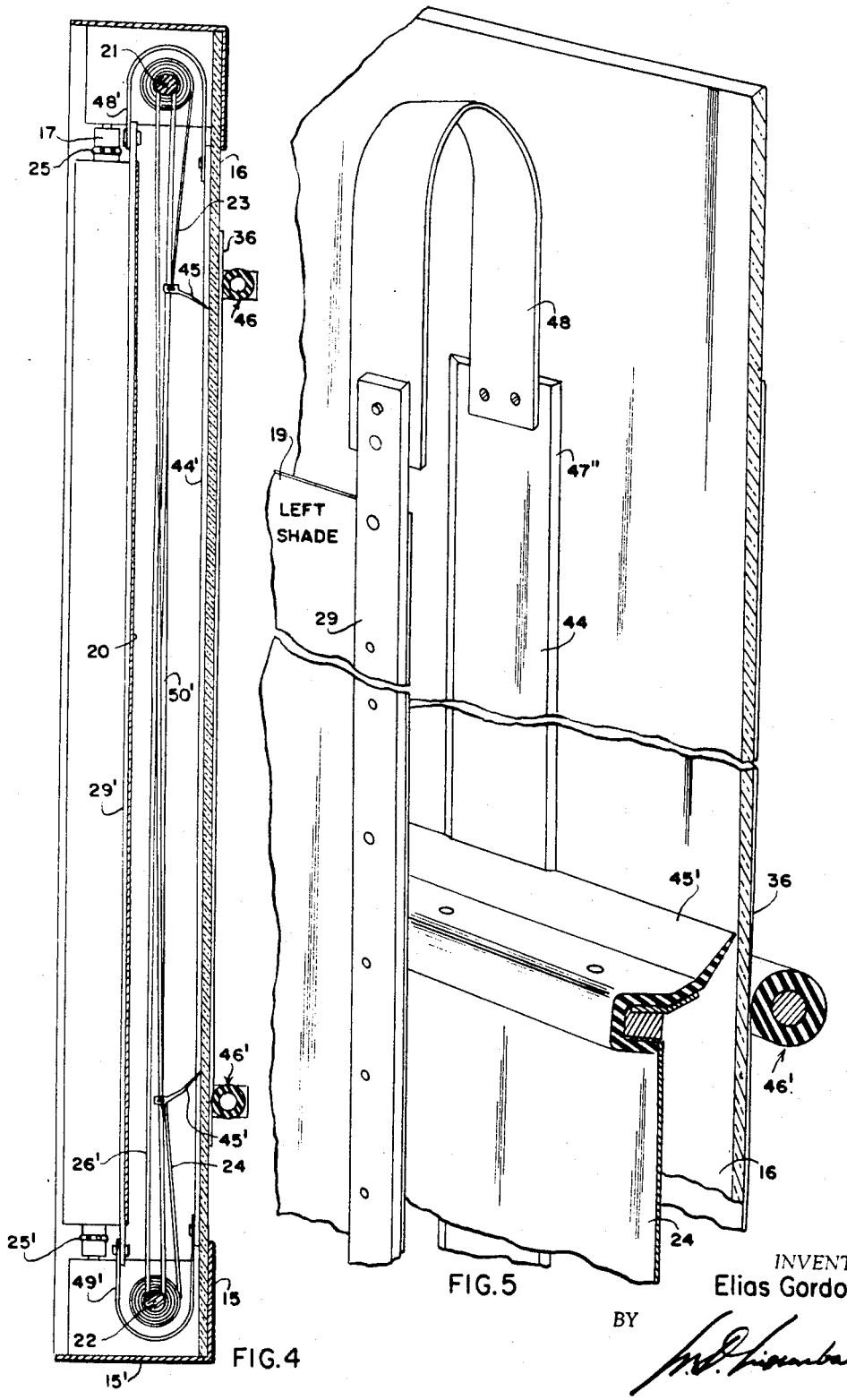
FIG. 4 is a magnified section taken at line 4—4 in FIG. 1.
FIG. 5 is a fragmentary magnified view shown partly in section and in perspective, of slat and sweep strip use to determine the shutter opening.

When the rollers 46, 46′ are omitted in the structure shown in FIG. 4, the film can be attached to the front of the pane 16 with pressure-sensitive tape. In embodiments where shutter opening determining members are in front of the pane 16, the film is inserted between them and the pane.

The shutter herein disclosed affords change of both dimensions of its rectangular opening. For use in apparatus requiring change in only one direction, the present shutter would be minus the shades 19, 20 and their appurtenances.

It may be noted that in the viewer 14, its light source may be furnished by one or more "iodine" bulbs 39, each of which is provided with a reflector 40. The light passes through a tank of liquid 41 where it is cooled and then after passing through a ground glass translucent pane 42, the passage of light is thereafter limited by the opening A, B, C, D offered by the shutter and then to illuminate the selected portion of the film, an X-ray film for instance, positioned across such opening, which is to be observed. Those versed in the art can readily adapt the shutter device to projection apparatus, without further illustration.

This invention is capable of numerous forms and various applications without departing from the essential features herein disclosed. It is therefore intended and desired that the embodiments shown and taught herein shall be deemed merely illustrative and not restrictive and that the patent shall cover all patentable novelty herein set forth, reference being had to the following claims rather than to the specific showing and description herein to indicate the scope of this invention.

I claim:

1. In a shutter device of the character described, the combination with a frame holding a transparent pane, two parallel rollers rotatably mounted in spaced relation on said frame behind said pane, two pliable opaque shades, one carried on each of said rollers, to unwind and wind up thereon; the lead edges of said shades being between said rollers, stiff members mounted one along the lead edge of each of said shades, an endless belt connecting said rollers; the flights of said belt crossing each other and secured to said stiff members respectively; the plane of said belt being substantially perpendicular to said pane, elongated members carried parallel, one by each of said lead edge members and in a direction along the lead edge member it is carried by; said elongated members resiliently pressing against said pane and each of said elongated members being in at least line contact with said pane and means to move said belt.

2. A shutter device as defined in claim 1, wherein at least one of said elongated members is a slat.

3. A shutter device as defined in claim 1, wherein each of said elongated members is a slat.

4. A shutter device as defined in claim 1, wherein at least one of said elongated members is a resilient sweep strip.

5. A shutter device as defined in claim 1, wherein each of said elongated members is a resilient sweep strip.

6. A shutter device as defined in claim 1, wherein at least one of said elongated members is a roller.

7. A shutter device as defined in claim 1, wherein each of said elongated members is a roller.

8. A shutter device as defined in claim 1, wherein said elongated members are in front of the pane.

9. A shutter device as defined in claim 1, wherein said elongated members are in back of the pane.

10. A shutter device as defined in claim 1, including two additional parallel shade rollers rotatably mounted in angular relation to the other shade rollers, in spaced relation on the frame behind said pane, two additional pliable opaque shades, carried by said additional shade rollers respectively, to wind up and unwind thereon respectively, the lead edges of said additional shades being between said additional shade rollers and in intersecting relation with both said stiff members, additional stiff members mounted along the lead edges of said additional shades respectively, an additional endless belt connecting said additional rollers; the flights of said additional belt crossing each other and secured to said stiff members on the additional shades respectively; the plane of said additional belt being substantially perpendicular to said pane, additional elongated members carried parallel, one by each of said additional lead edge members and in a direction along the additional lead edge member it is carried by; said additional elongated members resiliently pressing against said pane and each of them being in at least line contact with said pane and means to move said additional belt.

11. A shutter device as defined in claim 10, wherein said intersecting relation is substantially ninety degrees.

12. A shutter device as defined in claim 10, wherein each of the additional elongated members is a slat and each of the other elongated members is a resilient sweep strip pressing against said slats and the pane.

13. A shutter device as defined in claim 10, wherein each of the additional elongated members is a slat and each of the other elongated members is a resilient sweep strip pressing against said slats and the pane; said slats and sweep strips being behind the pane.

14. A shutter device as defined in claim 10, wherein each of the additional elongated members is a slat spaced from its associated additional lead edge member and wherein corresponding pairs of ends of said slat and lead edge member it is associated with, are connected by a resilient means biased to press the slat against the pane.

15. A shutter device as defined in claim 14, wherein each of said resilient means is a bow spring straddling one of the other first mentioned shade rollers respectively.

References Cited

UNITED STATES PATENTS

| | | | |
|---|---|---|---|
| 1,813,689 | 7/1931 | Weisker | 88—24 |
| 2,378,933 | 6/1945 | Klemm et al. | 88—24 |

NORTON ANSHER, *Primary Examiner.*

R. A. WINTERCORN, *Assistant Examiner.*